United States Patent
Yi et al.

(10) Patent No.: US 7,864,722 B2
(45) Date of Patent: Jan. 4, 2011

(54) MULTICAST SERVICE PROVIDING METHOD IN MOBILE COMMUNICATION SYSTEM

(75) Inventors: Seung June Yi, Seoul (KR); Young Dae Lee, Gyeonggi-Do (KR); So Young Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1854 days.

(21) Appl. No.: 10/664,550

(22) Filed: Sep. 19, 2003

(65) Prior Publication Data

US 2004/0117860 A1    Jun. 17, 2004

(30) Foreign Application Priority Data

Sep. 19, 2002    (KR) ............... 10-2002-0057459

(51) Int. Cl.
  *H04H 20/71* (2008.01)
  *H04B 7/212* (2006.01)
  *H04W 4/00* (2009.01)
  *H04L 12/56* (2006.01)

(52) U.S. Cl. ............... 370/312; 370/322; 370/329; 370/390; 455/466

(58) Field of Classification Search ............... 370/390, 370/322, 312, 329; 455/466
See application file for complete search history.

(56) References Cited

U.S. PATENT DOCUMENTS 6,252,868 B1    6/2001    Diachina et al.
2003/0035423 A1 *  2/2003    Beckmann et al. ......... 370/390
2003/0211855 A1 *  11/2003    Sarkkinen et al. ......... 455/466
2003/0220119 A1 *  11/2003    Terry .................... 455/466

FOREIGN PATENT DOCUMENTS

| | | |
|---|---|---|
| EP | 1283650 | 2/2003 |
| JP | 2001-053675 | 2/2001 |
| JP | 2002-204204 | 7/2002 |
| JP | 2002-521859 | 7/2002 |
| JP | 2002-532959 | 10/2002 |
| KR | 1020020000522 | 1/2003 |
| KR | 1020030015151 | 2/2003 |
| KR | 1020030029310 | 4/2003 |
| KR | 1020030032780 | 4/2003 |
| WO | WO 0035145 | 6/2000 |
| WO | WO 02-45334 A1 | 6/2002 |

OTHER PUBLICATIONS

"UTRAN Radio Interface Protocols", http://www.comlab.hut.fi/opetus/238/lecture, Sep. 21, 2005.

(Continued)

*Primary Examiner*—Jinsong Hu
*Assistant Examiner*—Opiribo Georgewill
(74) *Attorney, Agent, or Firm*—Lee, Hong, Degerman, Kang & Waimey

(57) ABSTRACT

A multimedia service data transmitting method is disclosed. A logical channel indicator is added in service data mapped to a shared channel so that a terminal can discriminate a type of the service data transmitted through the shared channel. The logical channel indicator is a target channel type field (TCTF) and included in a header of the service data (MAC protocol unit).

6 Claims, 6 Drawing Sheets

OTHER PUBLICATIONS

3GPP, "3rd Generation Partnership Project; Technical Specification Group Radio Access Network; MAC protocol specification (Release 5)", TS25.321 version 5.1.0 (Jun. 2002).

3GPP Organizational Partners, "3rd Generation Partnership Project; Technical Specification Group Radio Access Network; MAC protocol specification", 3GPP TS 25.321 V5.1.0, Jun. 2002.

LG Electronics; TSG-RAN Working Group 2 Meeting #30, "RAN considerations on MBMS", R2-021677, Jun. 24, 2002.

Siemens; TSG-RAN Working Group 2 Meeting #31, "UTRAN Architecture Aspects for MBMS", R2-022079, Aug. 19, 2002.

* cited by examiner

|      | DCH | RACH | FACH | DSCH | CPCH | BCH | PCH |
|------|-----|------|------|------|------|-----|-----|
| DCCH or DTCH | C/T | TCTF UE-ID C/T | TCTF UE-ID C/T | UE-ID C/T | UE-ID C/T | — | — |
| BCCH | — | — | TCTF | — | — | N | — |
| PCCH | — | — | — | — | — | — | N |
| CCCH | — | TCTF | TCTF | — | — | — | — |
| CTCH | — | — | TCTF | — | — | — | — |

MULTICAST SERVICE PROVIDING METHOD IN MOBILE COMMUNICATION SYSTEM

CROSS-REFERENCE TO RELATED APPLICATIONS

Pursuant to 35 U.S.C. §119(a), this application claims the benefit of earlier filing date and right of priority to the Korean Application No. 10-2002-57459, filed on Sep. 19, 2002, the content of which is hereby incorporated by reference herein in its entirety.

BACKGROUND OF THE INVENTION

1. Field of the Invention

The present invention relates to a method for providing a multimedia broadcast/multicast service (MBMS) of a universal mobile telecommunications system (UMTS), and more particularly, to a method for transmitting multicast data through a downlink shared channel.

2. Description of the Background Art

The developments in wireless mobile communications have lead users to favor using mobile phones rather than wired telephones. However, for services providing a large quantity of data, for example an amount above that generally provided by voice communications, to mobile phones through a wireless access network, the performance of mobile communication systems cannot match that of existing wired communication systems. Accordingly, technical developments for IMT-2000, a communication system allowing high capacity data communications, have been made and standardization of the technology is being actively pursued among various companies and organizations.

A universal mobile telecommunications system (UMTS) is a third generation mobile communication system that has evolved from a standard known as Global System for Mobile communications (GSM). This standard is a European standard which aims to provide an improved mobile communication service based on a GSM core network and wideband code division multiple access (W-CDMA) technology.

In December 1998, the ETSI of Europe, the ARIB/TTC of Japan, the T1 of the United States, and the TTA of Korea formed a Third Generation Partnership Project (3GPP). The 3GPP is creating detailed specifications for the UMTS technology. In order to achieve rapid and efficient technical development of the UMTS, five technical specification groups (TSG) have been created within the 3GPP for performing the standardization of the UMTS by considering the independent nature of the network elements and their operations.

Each TSG develops, approves, and manages the standard specification within a related region. Among these groups, the radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 shows a network structure of a general UMTS.

As shown in FIG. 1, the UMTS is roughly divided into a terminal (UE user equipment), a UTRAN and a core network.

The UTRAN includes one or more radio network subsystems (RNS). Each RNS includes an RNC and one or more Node Bs managed by the RNCs.

Node Bs are managed by the RNCs, receive information sent by the physical layer of a terminal (e.g., mobile station, user equipment and/or subscriber unit) through an uplink, and transmit data to a terminal through a downlink. Node Bs, thus, operate as access points of the UTRAN for a terminal.

The RNCs perform functions which include assigning and managing radio resources, and operate as an access point with respect to the core network.

A primary function of the UTRAN is constructing and maintaining a radio access bearer (RAB) for a call connection between the terminal and the core network. The core network applies quality of service (QoS) requirements of end-to-end to the RAB, and accordingly, the UTRAN can satisfy the QoS requirements of the end-to-end by constructing and maintaining the RAB.

The RAB service is divided into an Iu bearer service and a radio bearer service of a lower concept. The Iu bearer service handles reliable user data transmission between boundary nodes of UTRAN and the core network, while the radio bearer service handles reliable user data transmission between the terminal and UTRAN.

The core network includes a mobile switching center (MSC) and a gateway mobile switching center (GMSC) connected together for supporting a circuit switched (CS) service. The core network also includes a serving GPRS support node (SGSN) and a gateway GPRS support node connected together for supporting a packet switched (PS) service.

The services provided to a specific terminal are roughly divided into the circuit switched (CS) services and the packet switched (PS) services. For example, a general voice conversation service is a circuit switched service, while a Web browsing service via an Internet connection is classified as a packet switched (PS) service.

For supporting circuit switched services, the RNCs are connected to the MSC of the core network and the MSC is connected to the GMSC that manages the connection with other networks. For supporting packet switched services, the RNCs are connected to the SGSN and the GGSN of the core network. The SGSN supports packet communications with the RNCs and the GGSN manages the connection with other packet switched networks, such as the Internet.

Various types of interfaces exist between network components to allow the network components to transmit and receive information with each other. An interface between the RNC and the core network is defined as an Iu interface. In particular, the Iu interface between the RNCs and the core network for packet switched systems is defined as "Iu-PS" and the Iu interface between the RNCs and the core network for circuit switched systems is defined as "Iu-CS."

A radio network temporary identifier (RNTI) is used to identify a terminal while connection between the terminal and the UTRAN is maintained. Four RNTIs are defined; S-RNTI, D-RNTI, C-RNTI and U-RNTI.

The S-RNTI (Serving RNC RNTI) is assigned by an SRNC (Serving RNC) when a connection between a terminal and UTRAN is set. The S-RNTI is information by which the SRNC may identify a corresponding terminal.

The D-RNTI (Drift RNC RNTI) is assigned by a DRNC (Drift RNC) when a handover occurs between RNCs according to movement of a terminal. The D-RNTI is information by which the DRNC may identify a corresponding terminal.

The C-RNTI (Cell RNTI) is information by which a terminal may be identified in a CRNC (Controlling RNC). When a terminal enters a new cell, it is assigned a new C-RNTI value by the CRNC.

The U-RNTI (UTRAN RNTI) includes an SRNC identity and an S-RNTI. Since the SRNC and a terminal in the SRNC may be identified, it may be said that the U-RNTI provides absolute identification information.

When data is transmitted via a common transport channel, a MAC-c/sh entity adds the C-RNTI or the U-RNTI to a header of a MAC PDU which is then transmitted. A UE ID type indicator, which indicates a type of the RNTI added in the header of the MAC PDU, is also added to the header.

FIG. 2 illustrates a radio protocol between the terminal and the UTRAN on the basis of the 3GPP wireless access network standards.

With reference to FIG. 2, the radio access interface protocol includes horizontal layers comprising a physical layer, a data link layer and a network layer, and vertical planes comprising a user plane for transmitting data information and a control plane for transmitting control signals.

The user plane is a region to which traffic information of a user such as voice or an IP packet is transmitted. The control plane is a region to which control information such as an interface of a network or maintenance and management of a call is transmitted.

In FIG. 2, protocol layers can be divided into a first layer (L1), a second layer (L2) and a third layer (L3) based on three lower layers of an open system interconnection (OSI) standard model well known in the art of communication systems.

The first layer (PHY) provides an information transfer service to the upper layer by using various radio transfer techniques.

The first layer is connected to the MAC layer through a transport channel, and data is transferred between the MAC layer and the PHY layer through the transport channel.

Data is transmitted according to transmission time interval (TTI) through Jo the transport channel. The physical channel transfers data by dividing it by the unit of certain time called a frame. In order to synchronize the transport channel between the UE and UTRAN, a connection frame number (CFN) is used. The CFN value has the range of 0~255 in case of transport channels except for a paging channel (PCH). That is, CFN is repeatedly circulated by the period of 256 frames.

Besides the CFN, a system frame number (SFN) is also used to synchronize the physical channel. The SFN value has the range of 0~4095 and repeated by the period of 4096 frames.

The second layer (L2) includes a MAC layer, a radio link control (RLC) layer, a broadcast/multicast control (BMC) layer, and a packet data convergence protocol (PDCP) layer.

The MAC layer provides a re-allocation service of the MAC parameter for allocation and re-allocation of radio resources.

The MAC layer is connected to the radio link control (RLC) layer (which is an upper layer) through a logical channel, and various logical channels are provided according to the kind of transmitted information. In general, when information of the control plane is transmitted, a control channel is used. When information of the user plane is transmitted, a traffic channel is used.

The MAC is classified into an MAC-b sublayer, an MAC-d sublayer and an MAC-c/sh sublayer according to types of managed transport channels. The MAC-b sublayer manages a BCH (Broadcast Channel) handling broadcast of system information, while the MAC-c/sh sublayer manages shared transport channel such as FACH (Forward Access Channel), DSCH (Downlink Shared Channel), or the like, shared with other terminals.

In UTRAN, the MAC-c/sh sublayer is positioned at a control RNC (CRNC) and manages channels shared by every terminal in a cell, so that one MAC-c/sh sublayer exists in each cell.

The MAC-d sublayer manages a DCH (Dedicated Channel), a dedicated transport channel for a specific terminal. Accordingly, the MAC-d sublayer is positioned at a serving RNC (SRNC) managing a corresponding terminal, and one MAC-d sublayer exists also at each terminal.

A radio link control (RLC) layer supports a reliable data transmission and may perform a function of segmentation and concatenation of an RLC service data unit (SDU) coming from a higher layer. The RLC SDU transferred from the higher layer is adjusted in its size according to a throughput capacity at the RLC layer, to which header information is added, and then transferred in a form of a PDU (Protocol Data Unit) to the MAC layer. The RLC layer includes an RLC buffer for storing the RLC SDU or the RLC PDU coming from the higher layer.

A broadcast/multicast control (BMC) layer performs functions of scheduling a cell broadcast message (CB) transferred from the core network and broadcasting the CB to UEs positioned in a specific cell(s). At the side of UTRAN, the CB message transferred from the upper layer is combined with information, such as a message ID, a serial number or a coding scheme, and transferred in a form of BMC message to the RLC layer and to the MAC layer through a CTCH (Common Traffic Channel), a logical channel. In this case, the logical channel CTCH is mapped to a FACH (Forward Access Channel), a transport channel, and an S-CCPCH (Secondary Common Control Physical Channel), a physical channel.

A packet data convergence protocol (PDCP) layer is an upper layer of the RLC layer, allowing data to be transmitted effectively on a radio interface with a relatively small bandwidth through a network protocol such as the IPv4 or the IPv6. For this purpose, the PDCP layer performs a function of reducing unnecessary control information, which is called a header compression, and in this respect, RFC2507 and RFC3095 (robust header compression: ROHC), a header compression technique defined by an Internet standardization group called an IETF (Internet Engineering Task Force), can be used. In these methods, because the only information requisite for the header part of a data is transmitted, control information is transmitted, so that an amount of data transmission can be reduced.

The RRC layer positioned in the lowest portion of the third layer (L3) is defined only in the control plane and controls the logical channels, the transport channels, and the physical channels in relation to the setup, the reconfiguration, and the release of the RBs. The RB signifies a service provided by the second layer for data transmission between the terminal and UTRAN, and setting up the RB means processes of stipulating the characteristics of a protocol layer and a channel, which are required for providing a specific service, and setting the respective detailed parameters and operation methods.

The RLC layer may belong to the user plane or to the control plane depending upon the type of layer connected at the upper layer of the RLC layer. If the RLC layer receives data from the RRC layer, the RLC layer belongs to the control plane. Otherwise, the RLC layer belongs to the user plane.

As shown in FIG. 2, there may be several entities in one RLC layer or one PDCP layer layer. More than one layer may be present because one terminal generally has a plurality of RBs and only one RLC entity and only one PDCP entity are used for one RB.

The MAC-sublayer will now be described.

A primary function of the MAC layer existing between the RLC and the physical layer is mapping the logical channel and the transport channel. The reason is because channel processing methods of the upper layer and the lower layer of the MAC are different. That is, at the upper layer of the MAC, data is processed separately by using the control channel of the control plane and the traffic channel of the user plane according to the content of the data that the channel transmits. Meanwhile, at the lower layer, data is processed separately by using a common channel and a dedicated channel depending on whether a channel is shared, so inter-channel mapping is important.

FIG. 3 illustrates mapping relations between the logical channel and the transport channel at the UE. In case of UTRAN, the directions of arrows are the opposite.

Another important function of the MAC layer may be a logical channel multiplexing. The MAC maps several logical channels to one transport channel to obtain a multiplexing gain which heightens the efficiency of the transport channel. Such multiplexing may provide much higher gain for data transmitted intermittently and packet data. Therefore, the multiplexing function is used for an SRB (Signaling Radio Bearer) or a packet service (PS) RAB. Because data is continuously transmitted in a circuit service (CS) RAB, the multiplexing function is not used. The SRB is an RB used specifically for exchanging an RRC message or an NAS message between the terminal and the UTRAN.

Accordingly, the MAC provides a flexibility in channel selection and an efficiency of a channel resource through the channel mapping and logical channel multiplexing. In this case, in order to support the channel mapping and the logical channel multiplexing, additional functions are required. That is, four functions are additionally performed in the MAC.

1. Priority Handling

In order to support various channel mapping structures, the MAC performs a priority handling function. The priority handling includes two types: one is priority handling among several UEs, and the other is priority handling for one UE.

The priority handling among UEs corresponds to a case that data of several UEs are transmitted at the downlink through a common transport channel (FACH or DSCH). In this case, the MAC first transmits data of a UE with a higher priority. That is, the MAC suitably allocates the common channel to each UE at each transmission time interval (TTI), to thereby heighten an efficiency of the channel resource. This is related to a dynamic scheduling function.

A priority handling on one UE corresponds to a case that several logical channels belonging to one UE is mapped to one transport channel. The MAC determines a priority from the logical channel priority. This is related to a transport format combination selection, and the MAC selects a transport format combination that can first transmit data of a logical channel with a higher priority.

2. Transport Format Combination Selection

The MAC transmits transport blocks (TB) to the physical layer through the transport channel. The transport format (TF) means a regulation for a size and the number of TBs that one transport channel transmits. In determining the TF for a specific transport channel, the MAC should even consider the transport channel multiplexing in the physical layer.

The transport channel multiplexing refers to mapping plural transport channels to one coded composite transport channel (CCTrCH). Although this function is performed in the physical layer, the MAC should consider every transport channel mapped to the same CCTrCH in determining the TF. Actually, the amount of data processed in the physical layer is the amount of data transmitted through CCTrCH, so the MAC should determine the TF of each transport channel in consideration of CCTrCH. In this case, a combination of TF is called a transport format combination (TFC). The TFC is not determined by the MAC itself but selected from an available TFC set (TFCS) that the RRC layer informs. That is, the RRC informs the MAC of an available TFCS for one CCTrCH in an initial setting, and then the MAC selects a suitable TFC from the TFCS at each TTI.

Selection of a suitable TFC from a given TFCS at each TTI is a function performed by the MAC, which includes two steps.

First, the MAC constitutes a valid TFC set in the TFCS assigned to CCTrCH, and selects an appropriate TFC in the valid TFC set. The valid TFC set is a set of TFCs actually available for a corresponding TTI among assigned TFCS. The selection of a suitable TFC is take into account a channel environment changing at every moment. When a TFC is selected to be used in the corresponding TTI in the valid TFC set, the MAC selects a TFC on the basis of a priority of the logical channel. That is, the MAC selects a TFC that can transmit preferentially data of the logical channel with a higher priority, and such TFC selection is related to the priority processing function.

As for the RACH or CPCH, the common transport channel of the uplink, because one transport channel constitutes one CCTrCH, the term of the TF selection is used for the channels.

3. Identification

The MAC requires an identification function. The reason is because, first, the common transport channel is shared for use by several UEs, so each UE needs to be identified, and second, each logical channel needs to be identified due to the logical channel multiplexing. Accordingly, the MAC inserts four types of fields into a header of the MAC PDU for identification as shown in FIG. 4. The fields of the MAC header do not necessarily exist, and their existence is determined depending on a mapping relation of the logical channel and the transport channel.

The identification of the terminal is required when the dedicated logical channel such as DCCH or DTCH is mapped to a common transport channel such as RACH, FACH, CPCH (Control Physical Channel), DSCH or USCH (Uplink Shared Channel). For identification of each UE, the MAC adds a radio network temporary identity (RNTI), identification information of a terminal, to a UE-ID field of the header and transmits it. The RNTI includes U-RNTI (UTRAN RNTI), C-RNTI (Cell RNTI) and DSCH-RNTI, so the MAC also adds a UE-ID type field indicating which RNTI is used and transmits it.

Identification of the dedicated logical channels is made through a C/T field. The reason is because, first, unlike other logical channels, several dedicated channels can be mapped to one transport channel, and second, the dedicated logical channel is processed in an MAC-d of a serving radio network controller (SRNC) and other logical channels are provided in an MAC-c/sh of a control radio network controller (CRNC). Dedicated logical channels mapped to one transport channel respectively have a logical channel identity that is used as a C/T field value. If only one dedicated logical channel exists in the transport channel, the C/T field is not used.

FIG. 5 illustrates MAC header information according to a mapping relation between the dedicated logical channel and the transport channel in accordance with the conventional art.

As shown in FIG. 5, the C/T field exists only when several dedicated logical channels (DCCH or DTCH) are mapped, 'N' means non-existence of a header, and '-' means there is no mapping region. In addition, because the UE-ID field exists together with the UE-ID type field at the time, so it is simply indicated by UE-ID.

4. Measurement of Traffic Volume and Transport Channel Type Switching

In order to support the RRC in dynamically controlling a radio bearer, the MAC performs functions of measurement of a traffic volume and change of a type of a transport channel.

The measurement of traffic volume is performed on the transport channel. The MAC measures the size of the RLC buffer of every logical channel mapped to the transport channel at each TTI and adds the sizes to calculate a transport channel traffic volume. The traffic volume of a transport channel indicates the amount of data to be transmitted by that the transport channel. The MAC reports the measurement results to the RRC and the measurement results serve as a basis for the RRC to determine whether a corresponding transport channel may sufficiently transmit the measured amount of data.

The MAC reports the measurement result to the RRC. Unlike the measurement of the traffic volume performed at every TTI, the measurement result report is performed when a specific condition is satisfied unlike. The report type includes an event trigger method for reporting the measurement result when the measurement result exceeds a threshold value, and a periodical method for reporting the measurement result at every predetermined time.

Upon receiving the measurement result, the RRC determines whether a current transport channel is suitable for each radio bearer, and if the current transport channel is not suitable, the RRC commands the MAC to change a transport channel of a radio bearer. Namely, the transport channel type change is a function for effectively managing a resource of the transport channel by selectively using a suitable transport channel according to the amount of given data.

When a DCH is used, the efficiency of a coded-divided channel may be problematic and there may not be enough codes for use for data transmissions having burst characteristics that result in data being crowded at a specific time during a communication session. In order to solve this problem, several scrambling codes may be used. However, the complexity of a receiver may increase without increasing the efficiency of the code-divided channel.

The DSCH is a channel shared by several users transmitting dedicated control or traffic data. Several users may share one channel by performing code multiplexing. Therefore, the DSCH may be defined as a series of code sets.

Unlike the uplink, a code shortage occurs in the downlink because the number of codes one sector may have in one base station is limited due to a spreading factor. For a high transmission rate, a low spreading factor must be used, thereby reducing the number of physical channels.

Additionally, such data services generally have burst characteristics. Therefore, if one channel is continuously allocated to one service, codes cannot be used efficiently.

In order to solve these problems, a method in which one channel is shared by a plurality of users may be employed. In order to share one channel, code multiplexing is used. Code allocation is performed for every radio frame, for example time multiplexing.

The multimedia broadcast/multicast service (MBMS) will now be described.

The CBS has limitations. First, the maximum length of a CBS message is limited to 1230 octet. Therefore, a CBS message is not suitable for broadcasting or multicasting multimedia data. Second, since the CBS message is broadcast to every terminal in a specific cell, multicasting for providing a service to only a specific terminal group is not possible wirelessly. For these reasons, a new service called MBMS has been proposed.

The MBMS is a service for transmitting multimedia data such as audio, video or image data to plural terminals by using a unidirectional point-to-multipoint bearer service. The MBMS is divided into a broadcast mode and a multicast mode. That is, the MBMS is divided into an MBMS broadcast service and an MBMS multicast service.

1. Users receive a service announcement provided by a network. The service announcement indicates a list of services to be provided and provides related information to terminals.

2. The network sets a bearer for a corresponding broadcast service.

3. Users receive a service notification provided by the network. The service notification provides information related to broadcast data to be transmitted to terminals.

4. Users receive broadcast data from the network.

5. The network releases a bearer for a corresponding broadcast service.

The MBMS broadcast mode is a service for transmitting multimedia data to every user in a broadcast area. The broadcast area means a broadcast service available area. One or more broadcast areas may exist in one PLMN, one or more broadcast services can be provided in one broadcast area, and one broadcast service can be provided to several broadcast areas.

The MBMS multicast mode is a service for transmitting multimedia data only to a specific user group existing in a multicast area. The multicast area means a multicast service available area. One or more multicast areas can exist in one PLMN, one or more multicast services can be provided in one multicast area, and one multicast service can be provided to several multicast areas.

In the multicast mode, a user is requested to join a multicast group to receive a specific multicast service. At this time, the multicast group refers to a user group that receives the specific multicast service, and joining refers to a behavior of being admitted to the multicast group intending for receiving the specific multicast service.

1. A user subscribes to a multicast subscription group. Subscription involves establishing a relationship between a service provider and a user. A multicast subscription group is a group of users that have completed the subscription procedure.

2. Users that have subscribed to the multicast subscription group receive a service announcement provided by the network. The service announcement indicates a list of services to be provided and provides related information to terminals.

3. In order for a user that has subscribed to a multicast subscription group to receive a specific multicast service, the user must join a multicast group. A multicast group is a group of users that receive the specific multicast service. Joining a multicast group involves joining the users intending to receive the specific multicast service. Joining a multicast group is also referred to as MBMS multicast activation. Through MBMS multicast activation, a user may receive specific multicast data.

4. The network sets a bearer for a corresponding multicast service.

5. A user joining the multicast group receives a service notification provided by the network. The service notification provides information regarding multicast data to be transmitted to terminals.

6. Users receive multicast data from the network.

7. The network releases a bearer for a corresponding broadcast service.

MBMS data is transmitted from the RNC to a base station and to a terminal by using services of the PDCP layer, the RLC layer, the MAC layer and the physical layer positioned at the user plane of the UTRAN protocol. That is, the MBMS data transmitted from the core network (CN) is subjected to a header compression at the PDCP layer and transmitted as an RLC UM entity through an RLC UM SAP, and then, the RLC UM entity is transmitted to the MAC layer through the common traffic channel, the logical channel.

The MAC layer adds an MAC header to the received MBMS data and transfers it to the physical layer of the base station through the common transport channel. And then, the MBMS data undergoes coding and modulation in the physical layer and transmitted to the terminal through the common physical channel.

An MBMS RB, a radio bearer (RB) for the MBMS, serves to transmit user data of one specific MBMS service transferred from the core network to UTRAN to a specific terminal group. The MBMS RB is roughly divided into a point-to-multipoint RB and a point-to-point RB. In order to provide the MBMS service, UTRAN selects one of the two types of MBMS RBs. In order to select the MBMS RB, UTRAN recognizes the number of users of the specific MBMS service existing in one cell. UTRAN internally sets a threshold value, and if the number of users existing in a cell is smaller than the threshold value, UTRAN sets the point-to-point MBMS RB, whereas if the number of users existing in a cell is greater than the threshold value, UTRAN sets the point-to-multipoint MBMS RB.

The wireless system of the third generation partnership project (3GPP) proposes a downlink shared channel (DSCH) including a high speed downlink shared channel (HS-DSCH), particularly to support a packet data service.

In order for the DSCH to provide a multicast service, it should support the point-to-multipoint radio bearer, and at this time, the common logical channel such as CTCH or MTCH (MBMS Traffic Channel) should be mapped to the DSCH. In this respect, however, in the conventional art, because the DSCH transmits only data of the dedicated logical channel, a field for identifying a logical channel mapped to the DSCH is not added in the MAC header. Thus, when the common logical channel data is transmitted through the DSCH, in the case that the field indicating a type of the logical channel is not included in the MAC header in transmission of the DSCH, the terminal can not know which type of logical channel a data unit received through the DSCH belong to, and thus, there is a high possibility that a communication error occurs.

The above references are incorporated by reference herein where appropriate for appropriate teachings of additional or alternative details, features and/or technical background.

SUMMARY OF THE INVENTION

Therefore, an object of the present invention is to provide a data transmission method capable of discriminating a type of multicast service data when the multicast service data is transmitted through a shared channel.

Another object of the present invention is to provide a data transmission method capable of providing a multicast service through a shared channel.

To achieve at least the above objects in whole or in parts, there is provided a multicast service method in a wireless system in which service data of a logical channel is mapped to a common transport channel and transmitted to a terminal, including: adding a logical channel identifier to service data to be transmitted; and mapping corresponding service data to a common transport channel.

Preferably, the logical channel is a common logical channel or a dedicated logical channel, and the common logical channel can be a common traffic channel (CTCH), a common control channel, an MBMS traffic channel (MTCH), or an MBMS control channel (MCCH).

Preferably, the common transport channel is a downlink shared channel (DSCH).

Preferably, the common transport channel is a high speed downlink shared channel (HS-DSCH).

Preferably, the service data is multimedia broadcast/multicast service (MBMS) data.

Preferably, the service data is an MBMS protocol data unit, which is an MAC protocol data unit.

Preferably, the logical channel identifier is a target channel type field (TCTF), and the TCTF indicates whether a logical channel mapped to the common transport channel is a common logical channel or a dedicated logical channel. The logical channel identifier is added when the service data is transmitted from a medium access control (MAC) layer to a lower layer.

Preferably, the logical channel identifier is added by a common type of MAC entity such as an MAC-c/sh which manages a common radio resource of every terminal in a cell.

Preferably, the logical channel identifier is included in a header of the service data, and the header is an MAC header.

The multicast service method further includes adding a terminal identifier and an indicator indicating a type of the terminal identifier to the service data to be transmitted. The terminal identifier is an MBMS radio network temporary identifier (RNTI), a terminal group identifier, or an MBMS service identifier.

To achieve at least these advantages in whole or in parts, there is further provided a multicast service method in a wireless communication system in which service data of a common logical channel or a dedicated logical channel is mapped to a downlink shard channel (DSCH) or a high speed downlink shared channel (HS-DSCH) and transmitted to a terminal, wherein when a medium access control (MAC) transmits service data through DSCH or HS-DSCH, it also transmits an indicator indicating a type of mapping of a logical channel to the service data.

Preferably, the service data is a multimedia broadcast/multicast service (MBMS) data.

Preferably, the service data is an MBMS protocol data unit, and the MBMS protocol data unit is an MAC protocol data unit.

Preferably, the indicator is a target channel type field (TCTF).

Preferably, the MAC layer is an MAC-c/sh layer which manages a common resource of every terminal in a cell.

Preferably, the indicator is included in a header of the service data, and the header is an MAC header. The MAC header includes a terminal identifier and an indicator indicating a type of the terminal identifier.

Preferably, the terminal identifier is an MBMS radio network temporary identifier (RNTI), a terminal group identifier, or an MBMS service identifier.

To achieve at least these advantages in whole or in parts, there is further provided a multicast service method in a wireless communication system in which service received through downlink shard channel is transmitted to an upper layer of a terminal, including: reading a logical channel identifier from service data and recognizing a logical channel through which corresponding data is to be transmitted; and transmitting received data to an upper layer of a terminal through the recognized logical channel.

Preferably, the received data is multimedia broadcast/multicast service (MBMS) data.

Preferably, the logical channel identifier is a target channel type field (TCTF).

Preferably, if the logical channel for transmitting the service data is a common logical channel, the received data is transmitted to a resource link control (RLC) layer through the common logical channel. If the logical channel for transmitting the service data is a dedicated logical channel, the received data is transmitted to an MAC-d layer which manages a dedicated resource through the dedicated logical channel.

Preferably, the recognizing step is performed in a common type of medium access control (MAC) layer of a terminal such as an MAC-c/sh layer.

To achieve at least these advantages in whole or in parts, there is further provided a multicast service method in a wireless communication system in which data received through downlink shared channel is transmitted to an upper layer of a terminal, including: reading a logical channel identifier and a terminal identifier from received data; and transmitting the received data to an upper layer through a predetermined logical channel on the basis of the read logical channel identifier and terminal identifier.

Preferably, the logical channel identifier is a target channel type field (TCTF).

Preferably, the terminal identifier is an MBMS radio network temporary identifier (RNTI), a terminal group identifier, or an MBMS service identifier.

Preferably, the transmitting step includes: checking whether the logical channel identifier indicates a common logical channel; checking whether the terminal identifier indicates a terminal group to which a corresponding terminal belongs; and transmitting received data to an upper layer according to the check result.

Preferably, if the logical channel identifier indicates a common logical channel and the terminal identifier indicates a terminal group to which a terminal belongs, the received data is transmitted to a resource link control (RLC) layer through the common logical channel. If the logical channel identifier indicates the common logical channel but the terminal identifier does not indicate a terminal group to which a terminal belongs, the received data is discarded.

Preferably, if the logical channel identifier indicates a dedicated logical channel and the terminal identifier indicates a terminal group to which a terminal belongs, the received data is transmitted to an MAC-d layer. If the logical channel identifier indicates the dedicated logical channel but the terminal identifier does not indicate a terminal group to which a terminal belongs, the received data is discarded.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

The present invention is implemented in a mobile communication system such as a UMTS (Universal Mobile Telecommunications System) developed by 3GPP. However, the present invention can be also applied to a communication system opening in a different standard.

The present invention proposes a method in which when UTRAN transmits radio bearer data through a downlink shared channel (DSCH), the terminal determines to which logical channel it transfers the data received through DSCH. In the present invention, DSCH provides a point-to-multipoint radio bearer service as well as a point-to-point radio bearer service, and especially, transmits data of a common traffic channel such as CTCH and MTCH to a specific terminal group.

In order to discriminate the DSCH from that of the conventional art, in the present invention, if the DSCH is used to provide a point-to-multipoint radio bearer service, it is called a point-to-multipoint DSCH. On the other hand, if the DSCH is used to provide a point-to-point radio bearer service, it is called a point-to-point DSCH. Also, in the present invention, a DSCH includes a high speed downlink shared channel (HS-DSCH) so that a DSCH can be replaced by a HS-DSCH.

In the present invention, an indicator of whether corresponding data is multicast data or dedicated data is added in to multicast service data and transmitted through the downlink shared channel (DSCH). The indicator is included in a header of a MAC PDU as a target channel type field (TCTF).

Preferred embodiments of the present invention will now be described.

Referring to the conventional downlink shared transport channel (DSCH), a field for identifying a type of a logical channel mapped to the DSCH is not included in the MAC header because only data of the dedicated logical channel is transmitted. However, in order for the DSCH to provide a multicast service as well as a dedicated service, the DSCH should support a point-to-multipoint radio bearer (RB), for which the common logical channel, such as CTCH or MTCH, should be mapped to DSCH.

Figure 1:
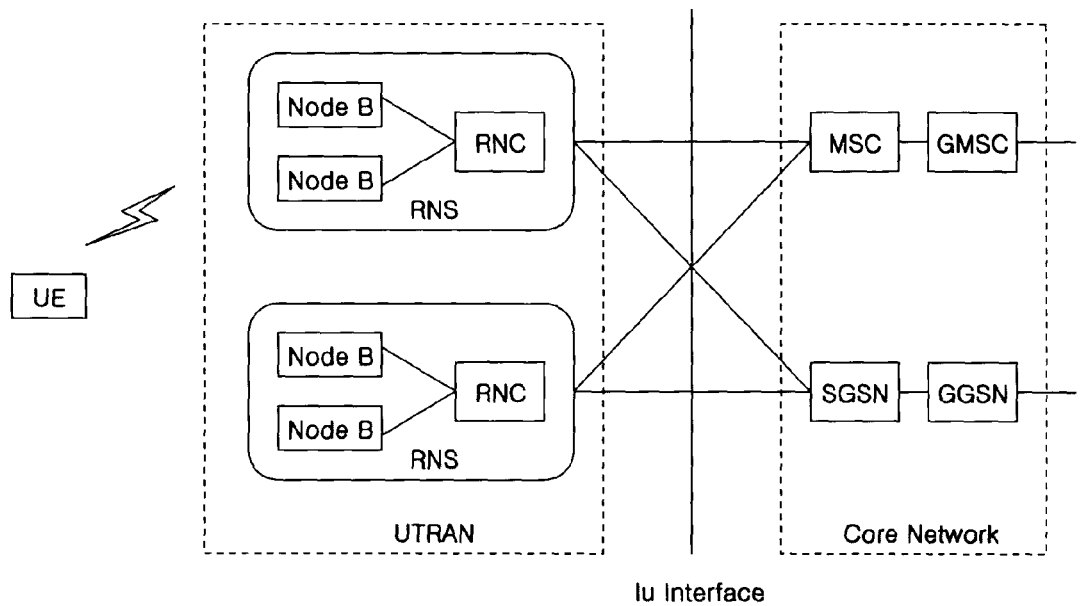
FIG. 1 illustrates a network structure of a general UMTS system.
Figure 2:
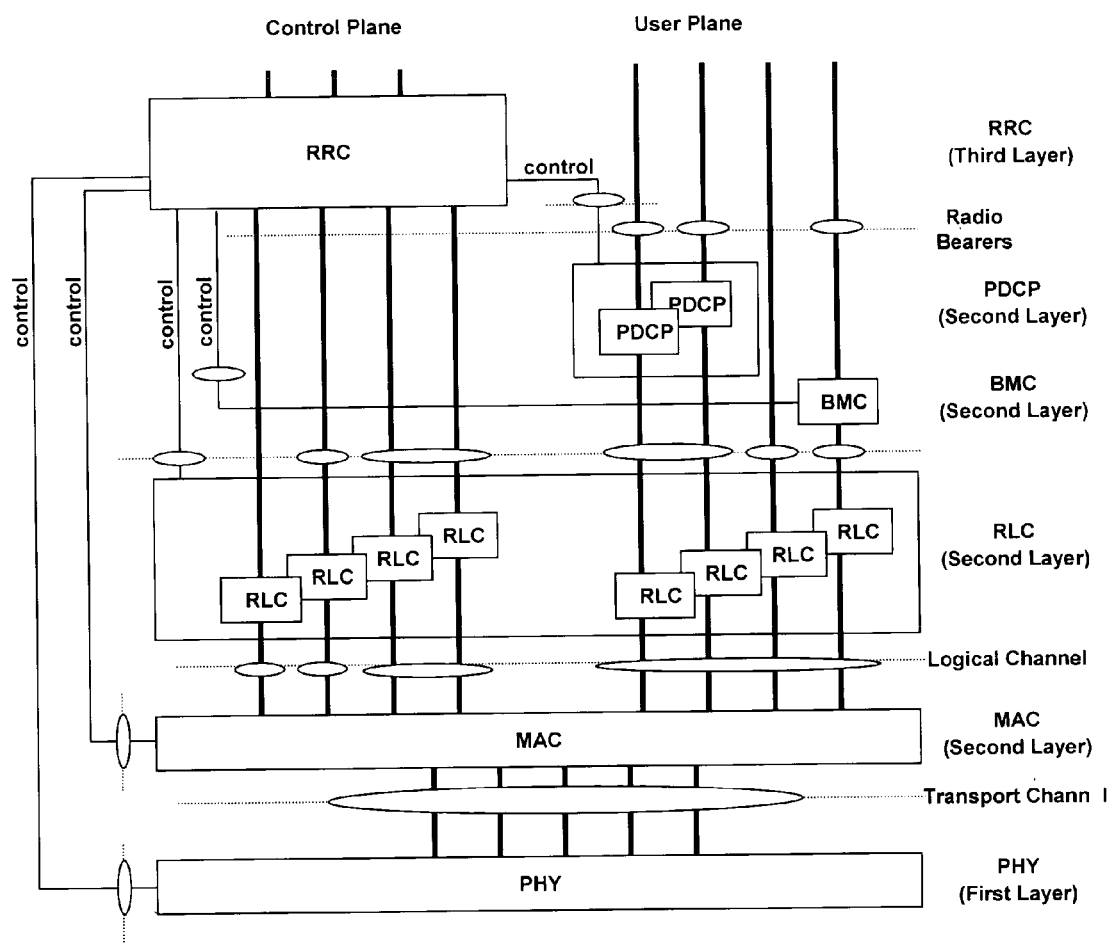
FIG. 2 illustrates a radio access interface protocol between the terminal and UTRAN on the basis of the 3GPP radio access network standards.
Figure 3:
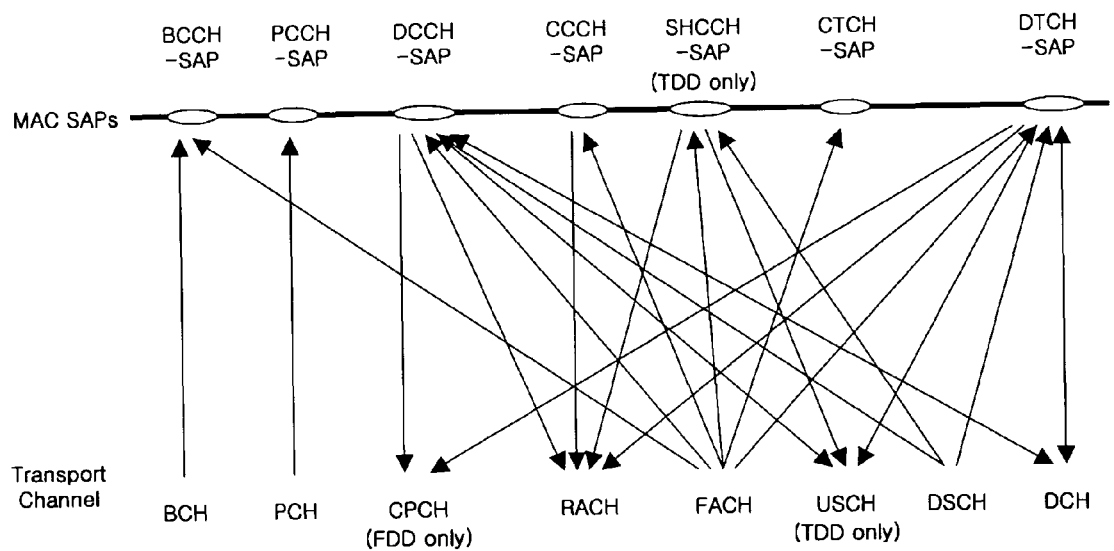
FIG. 3 illustrates an example of a mapping relation between a logical channel and a transport channel at the UE.
Figure 4:
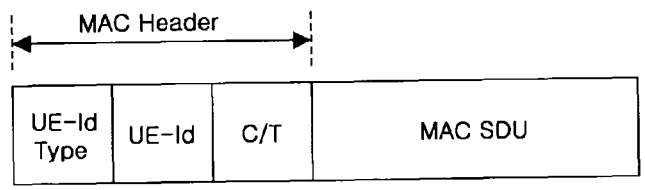
FIG. 4 illustrates a structure of MAC PDU for a point-to-point DSCH in accordance with a conventional art.
Figures 5, 6:
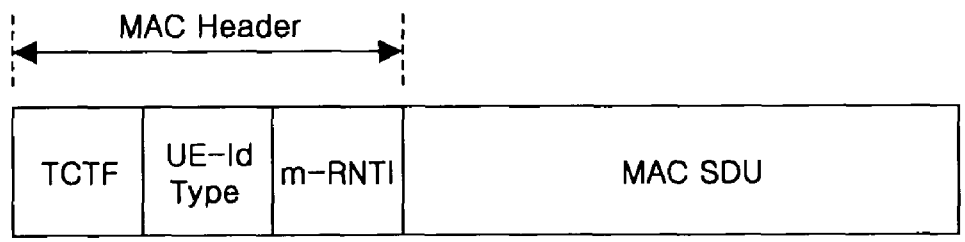
FIG. 5 illustrates MAC header information according to the mapping relation of a dedicated logical channel and the transport channel in accordance with the conventional art.
FIG. 6 illustrates a structure of MAC PDU for a point-to-multipoint DSCH in accordance with the present invention.

FIG. 6 illustrates a structure of the MAC PDU for the point-to-multipoint DSCH in accordance with the present invention.

As shown in FIG. 6, the MAC PDU transmitted through DSCH consists of an MAC header and MAC SDU. The MAC header may includes TCTF, UE ID type, and/or an MBMS identifier (m-RNTI).

The MAC header includes a TCTF field for identifying a type of a logical channel. The TCTF field indicates whether a channel mapped to DSCH is a dedicated logical channel (DTCH/DCCH) or a common logical channel (CTCH, BCCH, CCCH, MTCH, MCCH). That is, the TCTF field indicates whether multicast service data transmitted through the downlink shared channel (DSCH) is multicast data or dedicated data.

The UE ID type field indicates whether a type of a UE ID included in the MAC header is U-RNTI, C-RNTI, DSCH-RNTI or the MBMS identifier (m-RNTI).

The MBMS (m-RNTI) field indicates terminal identifier information. Generally, for the point-to-point DSCH, DSCH-RNTI is used as a UE ID in the MAC header, whereas for the point-to-multipoint DSCH, the MBMS identifier (m-RNTI) is used as the UE ID. Alternatively, instead of the MBMS identifier, an MBMS service identifier or a terminal group identifier is may be used as the UE ID.

Accordingly, UTRAN MAC attaches MAC header information to the RLC PDU transmitted through CTCH to construct a MAC PDU, that is, a transmission block, and transmits it to the physical layer through DSCH.

Figure 7:
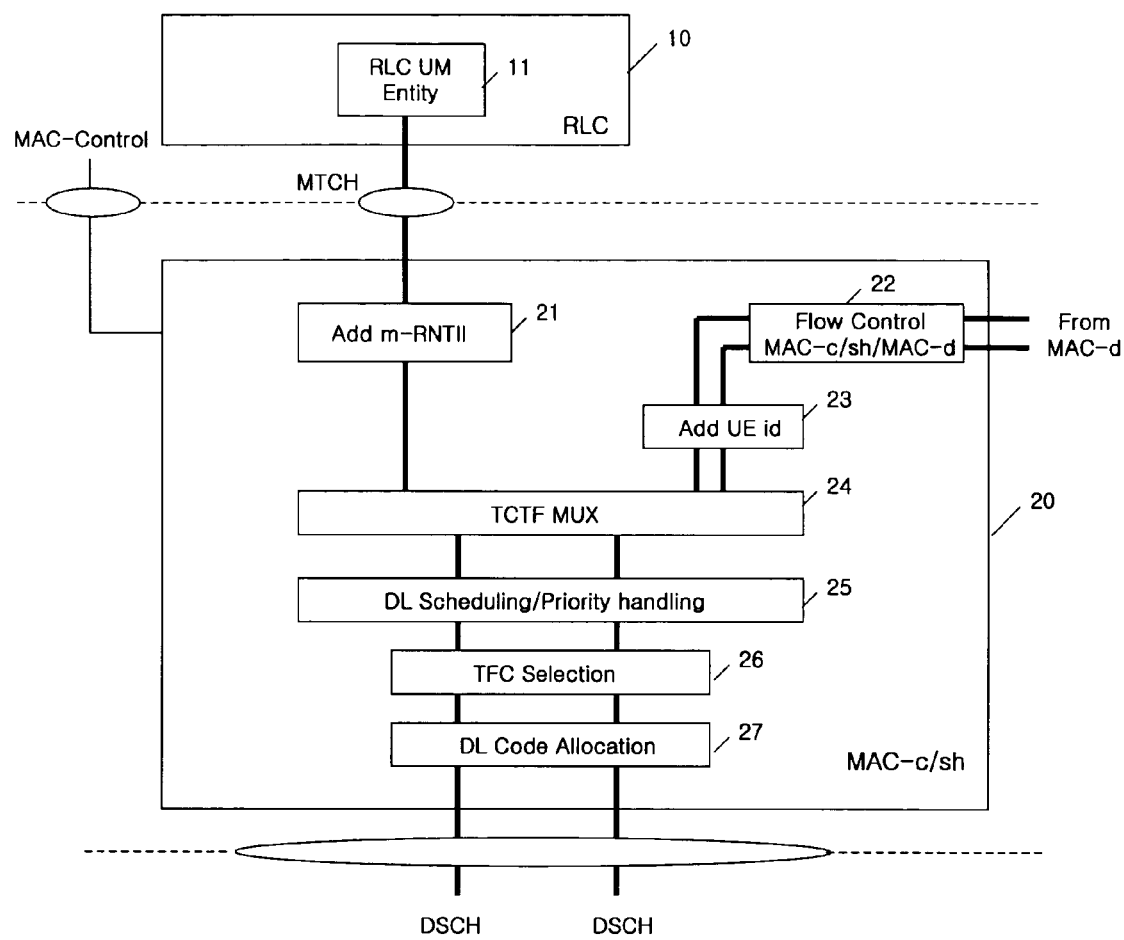
FIG. 7 illustrates a structure of an common type of an MAC of CRNC for the point-to-multipoint DSCH and a multicast data processing method.

FIG. 7 illustrates a structure of a common type of MAC of CRNC for the point-to-multipoint DSCH. The common type of MAC of CRNC supports the MBMS in UTRAN. An MAC-c/sh can be used as the common type of MAC in CRNC.

As shown in FIG. 7, an RLC UM (Unacknowledged Mode) of an RLC 10 exists in every MBMS point-to-multipoint radio bearer. Different RLC UM entities transmit MBMS data having different QoS (Quality of Service). One RLC UM entity has one CTCH. In FIG. 7, MTCH can be also used instead of CTCH.

Upon receiving the RLC PDU through CTCH, an MAC-c/sh 20 adds the m-RNTI and a UE ID to the RLC PDU and performs a TCTF multiplexing (steps S21, S23 and S24). At this time, a step S22 means a flow control between the MAC-c/sh and an MAC-d.

Thereafter, the MAC-c/sh performs a downlink scheduling function that suitably allocates the downlink shared channel to the terminal at every transmission time interval (TTI) and a priority handling function that transmits data with a higher priority first (step S25). At this time, the MAC-c/sh 20 can perform the priority handling by the following three types.
1. Priority handling among MBMS multicast groups (or MBMS services)
2. Priority handling on one MBMS multicast group (or one MBMS service)
3. Priority handling among data in an MBMS multicast group (or MBMS service)

For instance, when data of several MBMS multicast group is transmitted through the common transport channel such as FACH, DSCH or HS-DSCH at the downlink, the MAC-c/sh 20 transmits MBMS data with a higher priority first. This is related to a dynamic scheduling function, and such a method can heighten an efficiency of a channel resource by suitably allocating the common channel to the terminal at every TTI.

In case that several logical channels belonging to one MBMS service or one MBMS multicast group are mapped to one transport channel, the MAC-c/sh 20 determines a priority from a logical channel priority. This is related to a transport format combination selection, and the MAC-c/sh selects a transport format combination (TFC) that can transmit data of a logical channel with a higher priority first (step S26).

The MAC-c/sh selects TFCs of data to be transmitted through the point-to-multipoint DSCH, and selects a code of a downlink for transmitting a corresponding MAC PDU, that is, a channel code of a PDSCH (Physical Downlink Shared Channel) (physical channel) (step S27). In a specific PDSCH radio frame, the PDSCH channel code is used to transmit a corresponding MBMS service or an MBMS multicast group data.

Figure 8:
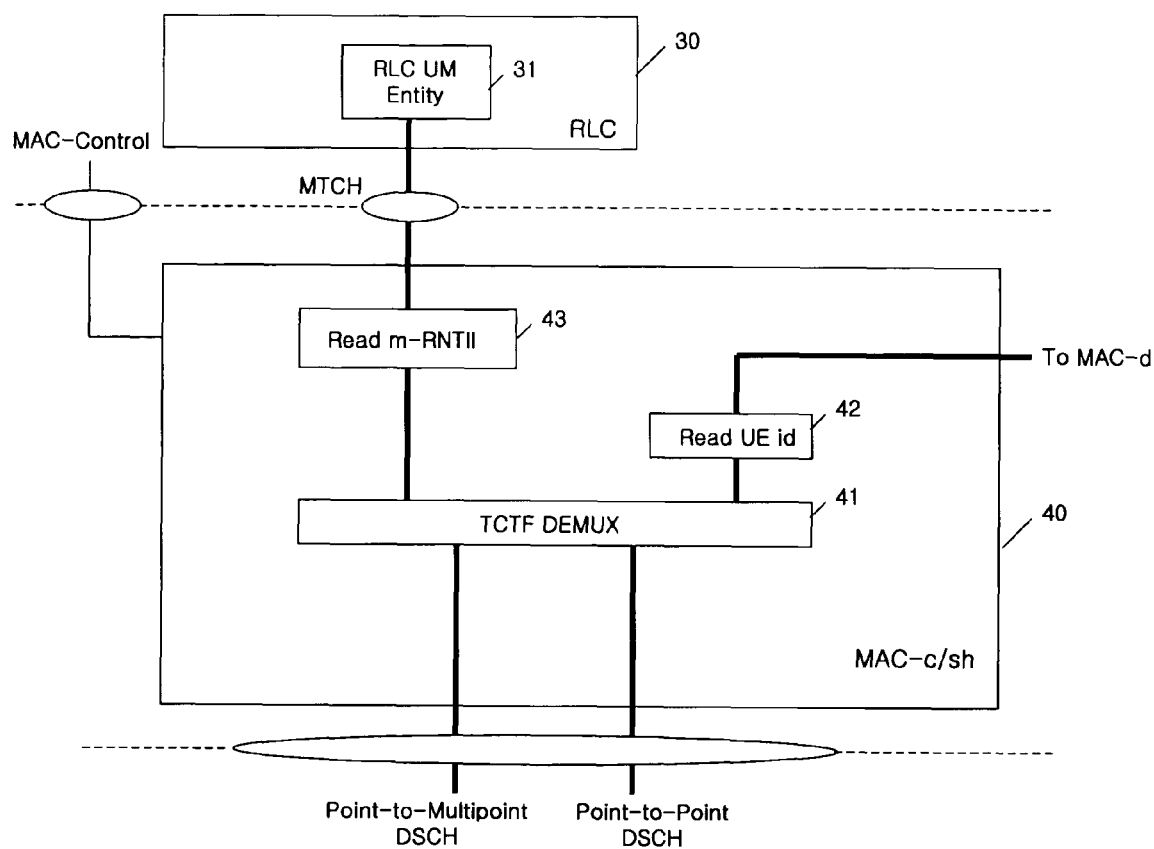
FIG. 8 illustrates a structure of an common type of an MAC of a terminal for the point-to-multipoint DSCH and a multicast data processing method.

FIG. 8 illustrates a structure of a common type of MAC of a terminal for the point-to-multipoint DSCH. The common type of MAC of a terminal supports the MBMS in UE. An MAC-c/sh can be used as the common type of MAC in UE.

As shown in FIG. 8, a physical layer of a terminal belonging to the MBMS multicast group first receives DSCH control information through DPCH, and then determines whether to receive DSCH during a specific radio frame depending on a content of the received DSCH control information.

If the DSCH control information informs that DSCH should be received during the specific radio frame for the MBMS service, the physical layer of the terminal receives DSCH during the specific radio frame according to the DSCH control information, decodes the MAC PDU, and transmits it to the MAC-c/sh of the terminal through the transport channel.

Then, the MAC-c/sh 40 of the terminal demultiplexes a TCTF field from the received MAC PDU (step S43), and checks whether the information of the TCTF field inserted in the MAC PDU indicates the dedicated logical channel (DTCH or DCCH) mapping or the common logical channel (e.g., CTCH, MTCH or MCCH) mapping.

If the information of the TCTF field indicates the dedicated logical channel (DTCH or DCCH) mapping, the MAC-c/sh 40 processes data in the same manner as the point-to-point DSCH of the conventional art. That is, if the information of the TCTF field indicates the dedicated logical channel mapping, the MAC-c/sh of the terminal reads a UE ID from the MAC header and discriminates whether the corresponding UE ID is its own ID. If the corresponding UE ID is its own ID, the MAC-c/sh of the terminal transmits the corresponding MAC PDU to the MAC-d layer.

If the information of the TCTF field inserted in the MAC PDU indicates the common logical channel (e.g. CTCH or MTCH) mapping, the MAC-c/sh of the terminal checks whether the UE ID type field indicates inclusion of the MBMS RNTI (m-RNTI). If the UE ID type field does not indicate inclusion of m-RNTI, the MAC-c/sh discards the corresponding MAC PDU.

If, the UE ID type field indicates inclusion of m-RNTI, the MAC-c/sh 40 reads m-RNTI from the MBMS identifier field (step S43) and checks whether the read m-RNTI indicates a multicast service that the terminal desires to receive. If the read m-RNTI does not indicate the multicast service that the terminal desires to receive, the MAC-c/sh 40 discards the corresponding MAC PDU.

If the corresponding m-RNTI indicates the multicast service that the terminal desires to receive, the MAC-c/sh 40 transmits the RLC PDU to an RLC UM entity 31 of the RLC layer 30 of the terminal through the corresponding common logical channel (CTCH) by using the logical channel type (e.g., CTCH) inserted in the corresponding MAC PDU and identification information. That is, on the basis of the TCTF inserted in the MAC PDU and the information of the MBMS identifier field, the MAC-c/sh 40 of the terminal can recognize from which logical channel the data (MAC PDU) has been transmitted and through which logical channel the data is to be transmitted to the RLC layer of the terminal.

As so far described, the method for transmitting multicast data through a downlink shared channel of the present invention has the following advantage.

That is, by including the TCTF field in the header of the MAC PDU that the DSCH transmits, when DSCH supports the point-to-multipoint radio bearer, a type of a mapped logical channel can be known. Therefore, the MAC-c/sh of the terminal that receives the DSCH data can recognize from which logical channel the data (MAC PDU) has been transmitted and through which logical channel the data is to be transmitted to the RLC layer of the terminal.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of providing a multicast service in a wireless communication system, the method comprising:
    mapping at least one logical channel onto a transport channel; and
    transmitting, to a user equipment (UE), data of the at least one logical channel through the transport channel, wherein the data is added with a header including a first identifier for identifying the at least one logical channel and a second identifier for identifying the multicast service,
    wherein the second identifier is used to distinguish between MBMS services,
    wherein the at least one logical channel comprises a MBMS point-to-multipoint traffic channel (MTCH) and the MTCH is mapped onto at least one transport channel,
    wherein the at least one logical channel is located between a Radio Link Control (RLC) layer and a Medium Access Control (MAC) layer and the transport channel is located between the MAC layer and a physical (PHY) layer,
    wherein the MAC layer comprises a plurality of MAC sub layers, wherein each of the first identifier and the second identifier is added by a MAC-c/sh layer that processes a common or shared data,
    wherein the MAC-c/sh layer further performs a scheduling function or a priority handling function,
    wherein the first identifier is a Target Channel Type Field (TCTF) and the second identifier is a Multimedia Broadcast/Multicast Service (MBMS) identifier, and
    wherein the MBMS identifier is identified by a Radio Resource Control (RRC) layer, and the first identifier and the second identifier are only utilized when the MTCH is mapped onto at least one transport channel, and
    wherein the MBMS identifier is an MBMS radio network temporary identifier (m-RNTI).

2. The method of claim 1, wherein a third identifier for distinguishing a type of the second identifier is further included in the header.

3. The method of claim 2, wherein the third identifier is a UE (user equipment) ID type.

4. A method of receiving a multicast service in a wireless communication system, the method comprising:
    receiving, at a user equipment (UE), data of at least one logical channel through a transport channel, wherein the data is added with a header including a first identifier for identifying the at least one logical channel and a second identifier for identifying the multicast service, wherein the second identifier is used to distinguish between MBMS services;
    identifying the at least one logical channel and the multicast service according to the first identifier and the second identifier included in the header; and
    delivering the data to a logical channel that is mapped onto the transport channel according to the first identifier,
    wherein the at least one logical channel comprises a MBMS point-to-multipoint traffic channel (MTCH) and the MTCH is mapped onto at least one transport channel,
    wherein the at least one logical channel is located between a Radio Link Control (RLC) layer and a Medium Access Control (MAC) layer and the transport channel is located between the MAC layer and a physical (PHY) layer,
    wherein the MAC layer comprises a plurality of MAC sub layers,
    wherein each of the first identifier and the second identifier is added by a MAC-c/sh layer that processes a common or shared data,
    wherein the MAC-c/sh layer further performs a scheduling function or a priority handling function,
    wherein the first identifier is a Target Channel Type Field (TCTF) and the second identifier is a Multimedia Broadcast/Multicast Service (MBMS) identifier, and
    wherein the MBMS identifier is identified by a Radio Resource Control (RRC) layer, and the first identifier and the second identifier are only utilized when the MTCH is mapped onto at least one transport channel, and
    wherein the MBMS identifier is an MBMS radio network temporary identifier (m-RNTI).

5. The method of claim 4, wherein a third identifier for distinguishing a type of the second identifier is further included in the header.

6. The method of claim 5, wherein the third identifier is a UE (user equipment) ID type.

* * * * *